(12) United States Patent
Ben Yahia

(10) Patent No.: US 7,003,968 B2
(45) Date of Patent: Feb. 28, 2006

(54) MOTOR VEHICLE AIR-CONDITIONING INSTALLATION EQUIPPED WITH AN ELECTRONIC CONTROL DEVICE

(75) Inventor: Mohamed Ben Yahia, Paris (FR)

(73) Assignee: Valeo Climatisation S.A., La Verriere (FR)

( * ) Notice: Subject to any disclaimer, the term of this patent is extended or adjusted under 35 U.S.C. 154(b) by 0 days.

(21) Appl. No.: 10/499,780

(22) PCT Filed: Dec. 4, 2002

(86) PCT No.: PCT/FR02/04184

§ 371 (c)(1),
(2), (4) Date: Jun. 21, 2004

(87) PCT Pub. No.: WO03/053727

PCT Pub. Date: Jul. 3, 2003

(65) Prior Publication Data
US 2005/0172652 A1    Aug. 11, 2005

(51) Int. Cl.
F25B 39/04    (2006.01)

(52) U.S. Cl. .............. 62/183; 62/228.3; 62/228.5; 62/323.4

(58) Field of Classification Search ................. 62/183, 62/208–209, 228.1, 228.3, 228.5, 323.4; 165/42–43
See application file for complete search history.

(56) References Cited

U.S. PATENT DOCUMENTS

| 2,057,101 A | * | 10/1936 | Kagl | 62/209 |
| 2,267,607 A | * | 12/1941 | Harvey | 62/209 |
| 2,389,073 A | * | 11/1945 | Newton | 62/203 |
| 2,984,993 A | * | 5/1961 | Carraway | 62/171 |

* cited by examiner

Primary Examiner—William E. Tapolcai
(74) Attorney, Agent, or Firm—Ronald Courtney

(57) ABSTRACT

The invention proposes an air conditioning installation furnished with an injection computer (42), with an air conditioning apparatus and with an electronic control device (401). The installation furthermore comprises measurement facilities making it possible to establish values relating to the temperature of the external air stream at the inlet of the condenser, to the pressure at the outlet of the compressor (123), and to the pressure at the inlet of the compressor (122). The electronic control device (401) implements the solving of a linear equation, relating the mass flow rate of the refrigerant to the values measured by the measurement facilities so as to calculate an estimate of a quantity relating to the refrigerant. On the basis of this quantity, the electronic device can estimate the power absorbed by the compressor (14).

29 Claims, 7 Drawing Sheets

Figure 1:
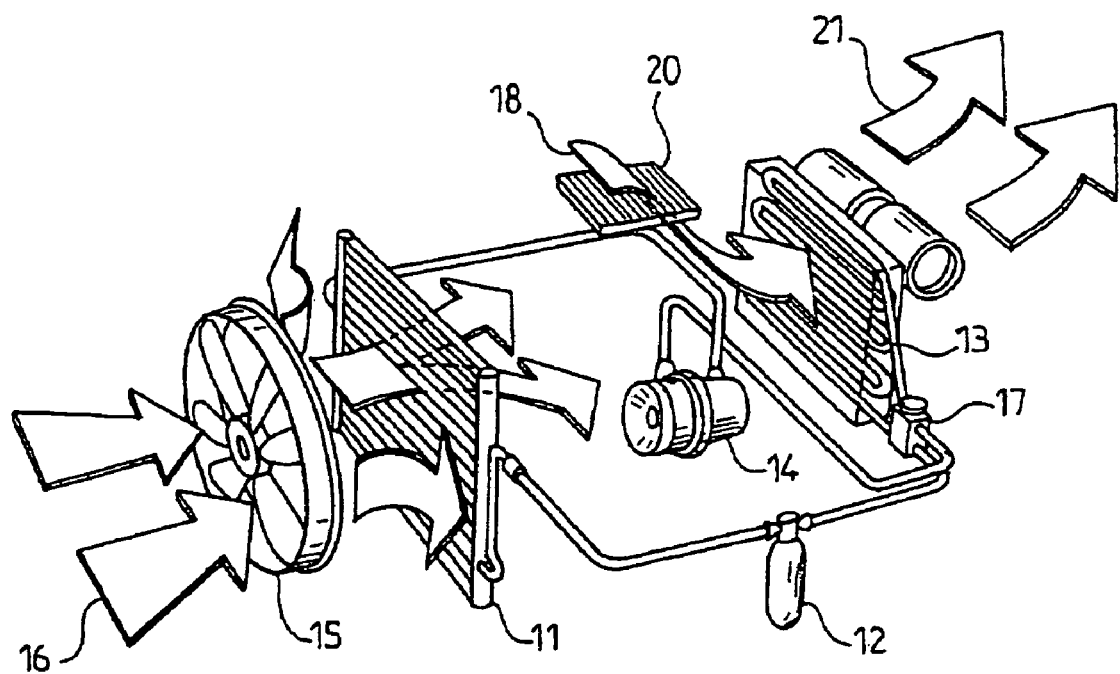

MOTOR VEHICLE AIR-CONDITIONING INSTALLATION EQUIPPED WITH AN ELECTRONIC CONTROL DEVICE

The invention relates to the air conditioning circuits of engined vehicles.

In conventional engined vehicles, the compressor of the air conditioning circuit is driven by the engine and therefore consumes a part of the power of the engine. Although the power absorbed by the compressor, when it is running, is not significant, it nevertheless influences the efficiency of the engine. By decreasing the efficiency of the engine, the power actually absorbed by the compressor increases the consumption of fuel and the pollution generated by the vehicle's exhaust gases.

To optimize the efficiency of the engine, one solution consists in estimating the instantaneous power actually absorbed by the compressor. Knowledge of this information makes it possible, in fact, to adapt the injection parameters of the engine to the actual requirements. In the absence of this information, the injection computer chooses, by default, injection parameters corresponding to the maximum value of the power absorbed, which value is rarely attained in practice.

This drawback may be of concern to internally controlled mechanical compressors which operate by way of the clutch coupling interposed between the engine and the compressor. In regulated mode, the internally controlled compressors adapt their volumetric capacity according to a linear law connecting the value of the pressure at the inlet of the compressor, the so-called low pressure, to the compressor outlet value, the so-called high pressure. Nevertheless, it may happen that the power actually absorbed by the compressor is less than its nominal power.

Such compressors absorb a power which depends on the operating conditions and which cannot therefore be reduced, even if the power actually absorbed by the compressor is known. On the other hand, it is possible to regulate the operation of the air conditioning by decoupling the compressor when the power is not acceptable.

This drawback is an even greater impediment in respect of externally controlled compressors, the use of which is generalized.

Specifically, in externally controlled mechanical compressors, the power actually absorbed by the compressor is often less than its nominal power. Subsequently, the injection must compensate for the discrepancy between the nominal mechanical power and the mechanical power actually absorbed, thereby decreasing the efficiency of the engine.

In known embodiments, use is made of a map which provides an estimate of the instantaneous power absorbed by the compressor as a function of the instantaneous value of the high pressure measured by a first sensor and of an information item relating to the operation of the vehicle and measured by a second sensor. This device is an empirical device which is based on a map which is established using tests and is installed in the air conditioning computer.

This method has the drawback of not taking all the possible cases into account and therefore remains approximate.

In the case of electric compressors, the instantaneous value of the power absorbed by the compressor is easily available since the volumetric capacity of these compressors—and hence the mass flow rate of the refrigerant absorbed—is known. However, for compressors of this type, the problem arises of anticipating the overshoot of the maximum electric power absorbed by the compressor as the speed of rotation of the compressor increases. Specifically, if the existing embodiments make it possible to know the instantaneous value of the electric power consumed, they do not make is possible to forecast the value that this power will take as a function of the alterations in the speed of rotation. This inability to forecast the threshold of overshoot of this critical speed of the compressor permits a posteriori solutions only. One of these solutions consists in triggering the internal safety feature of the engine so as to limit the power absorbed by the compressor and hence the speed.

Most of the existing embodiments use empirical methods to adjust the power absorbed by the compressor. However, it had been thought that a simple relation existed between the high pressure and the power absorbed by the compressor. Nevertheless, a device based on such a relation has not been produced.

It is an aim of the present invention to propose a device making it possible to provide an estimate of the power absorbed, on the basis of a simple relation between the mass flow rate of the refrigerant at the high pressure.

It is a further aim of the present invention to provide such a device capable of obtaining an estimate of correct accuracy.

To this end the invention proposes an air conditioning installation for vehicle with engine furnished with an injection computer. The installation comprises a refrigerant closed circuit comprising a compressor, a condenser, a relief valve and an evaporator, the condenser receiving a stream of air passing through an electric fan assembly, as well as an electronic control device intended to interact with the refrigerant closed circuit and the injection computer.

Advantageously, the installation comprises measurement facilities making it possible to establish:

a first value relating to the temperature of the external air stream at the inlet of the condenser, a second value relating to the pressure at the outlet of the compressor, termed the high pressure, a third value relating to the pressure at the inlet of the compressor, termed the low pressure, the electronic control device being able to implement the solving of a linear equation, relating the mass flow rate of the refrigerant to the values measured by the first and the second measurement facility so as to calculate an estimate of a quantity relating to the refrigerant and to estimate, on the basis of this quantity, of the measurements delivered by said measurement facilities and of the information items transmitted by the injection computer, the power absorbed by the compressor.

In one form of embodiment, the compressor is a mechanical compressor and the quantity calculated by the electronic control device is the mass flow rate of the refrigerant.

In another form of embodiment, the compressor is an electrical compressor and the quantity calculated by the electronic control device is the high pressure of the refrigerant.

According to the first form of embodiment, the electronic control device is able to calculate an estimate of the mass flow rate of the refrigerant on the basis of the values measured by the first and the second measurement facility and of two information items relating to the operation of the vehicle, that are transmitted by the injection computer.

Advantageously, the electronic control device is also able to calculate the power absorbed by the compressor on the basis of the calculated estimate of the mass flow rate, of the values measured by the second and the third measurement facility, and of information items relating to the operation of the vehicle, that are delivered by the injection computer.

In the second form of embodiment according to the invention, the electronic control device is able to calculate an estimate of the high pressure of the refrigerant on the basis of the value measured by the first measurement facility, of the value of the mass flow rate of the refrigerant and of two information items relating to the operation of the vehicle, that are transmitted by the injection computer.

Advantageously, the electronic control device is able to calculate the power absorbed by the compressor on the basis of the estimate of the high pressure calculated, of the value measured by the third measurement facility, and of information items relating to the operation of the vehicle, that are delivered by the injection computer.

As a supplement, according to this second form of embodiment, the electronic control device is capable, for a given starting state, of iteratively calculating values of the power absorbed by the compressor, on the basis of values of the high pressure corresponding to small chosen variations of the speed of rotation so as to estimate the maximum speed of rotation.

The invention also covers a program product, which may be defined as comprising the functions for solving said equation so as to estimate the power absorbed by the air conditioner.

Figure 2:
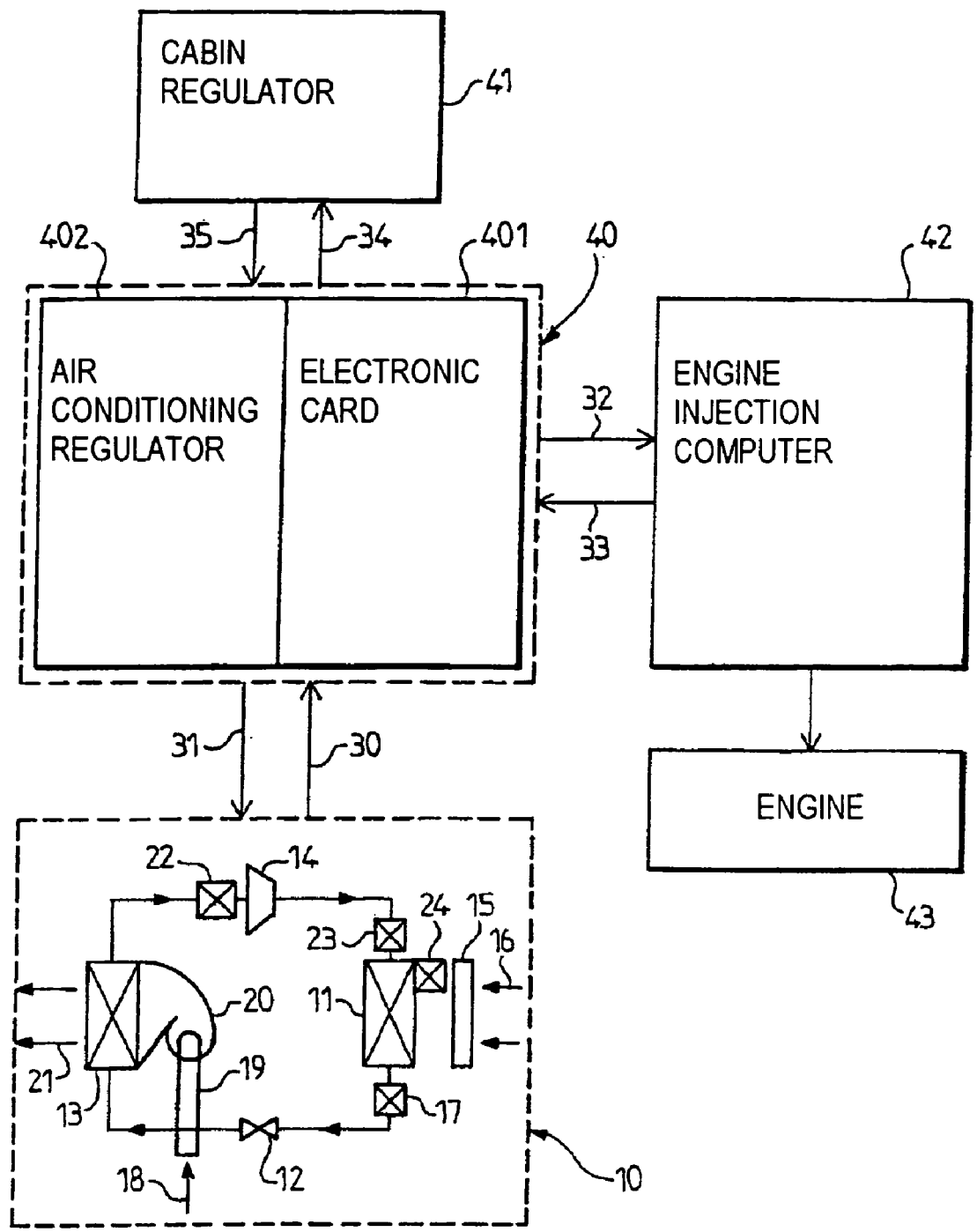
Figure 3:
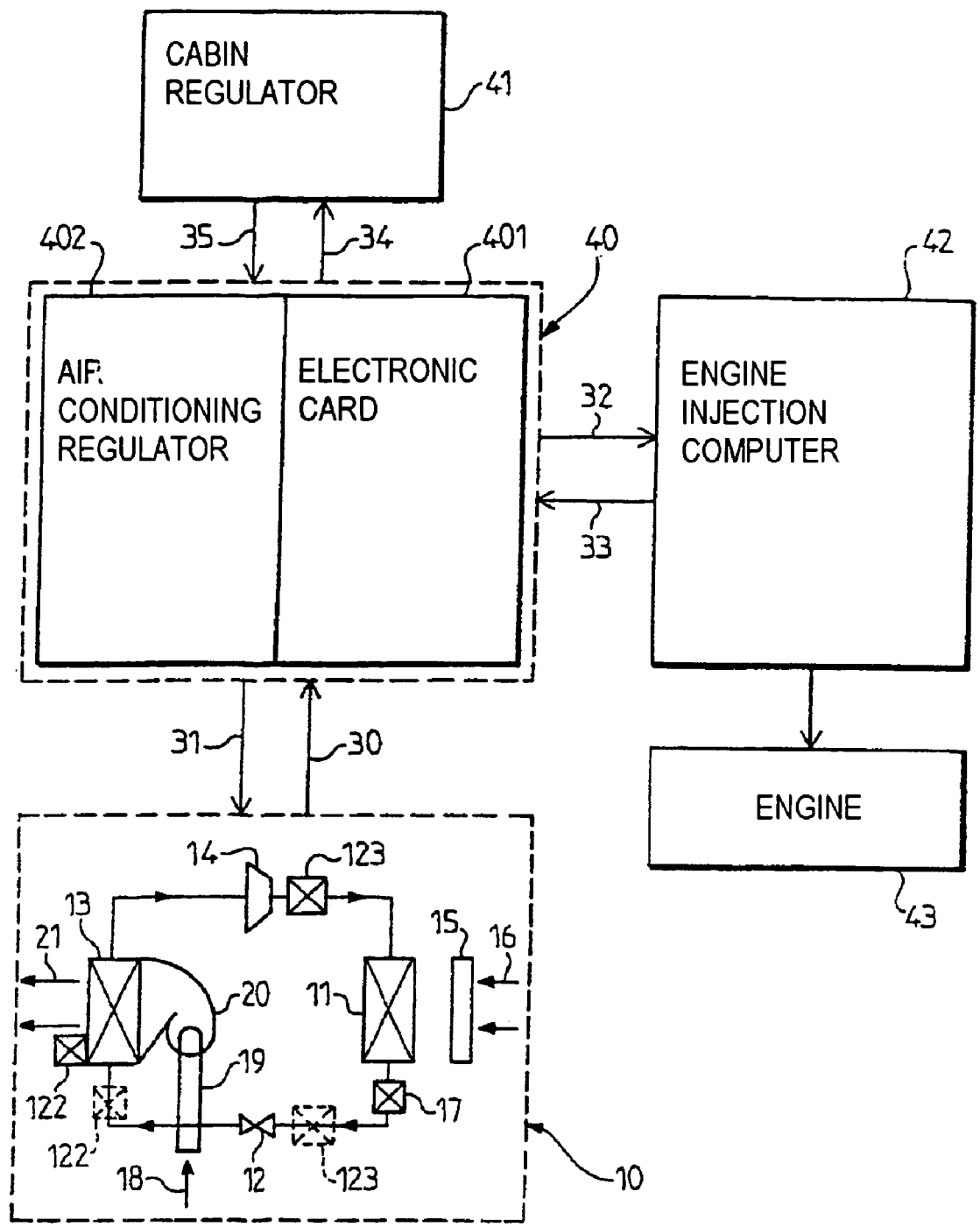
Figure 4:
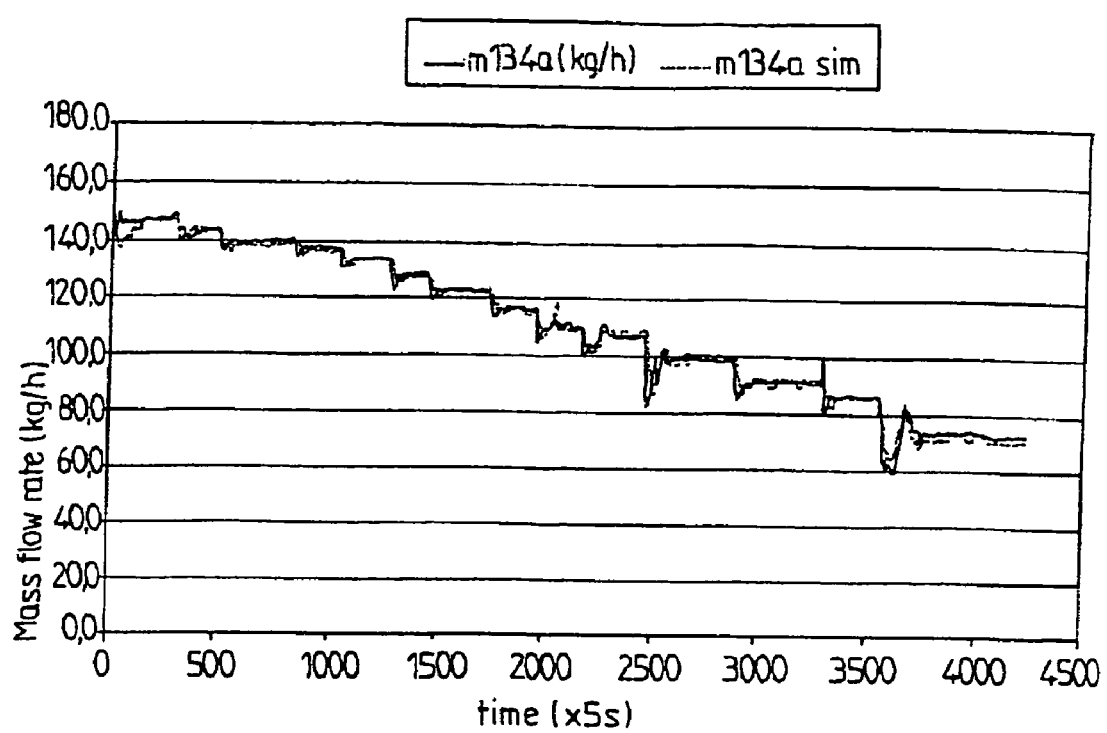
Figure 5:
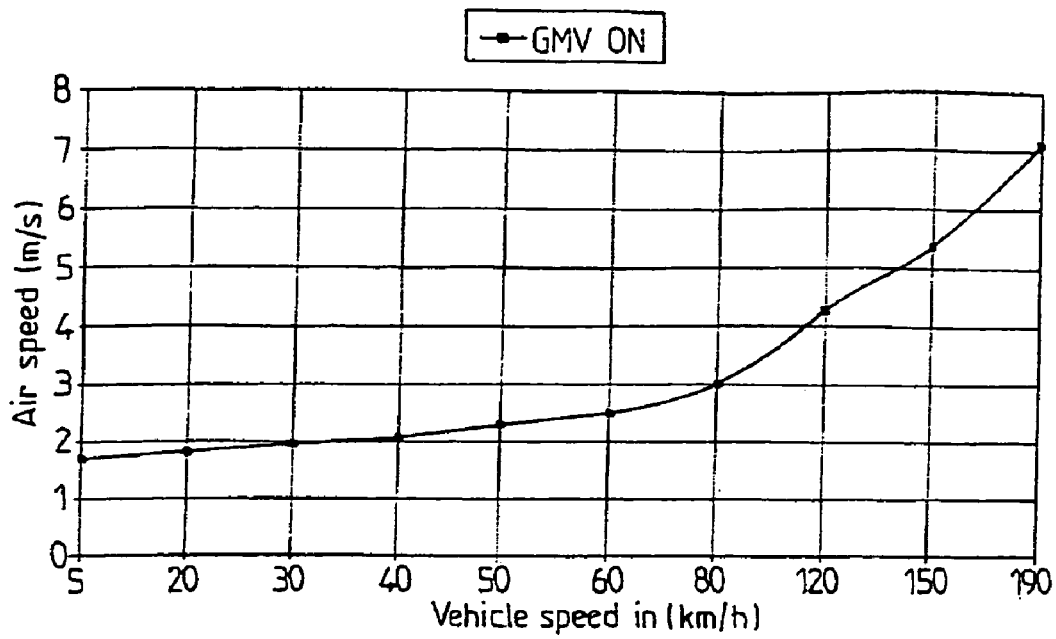
Figure 6:
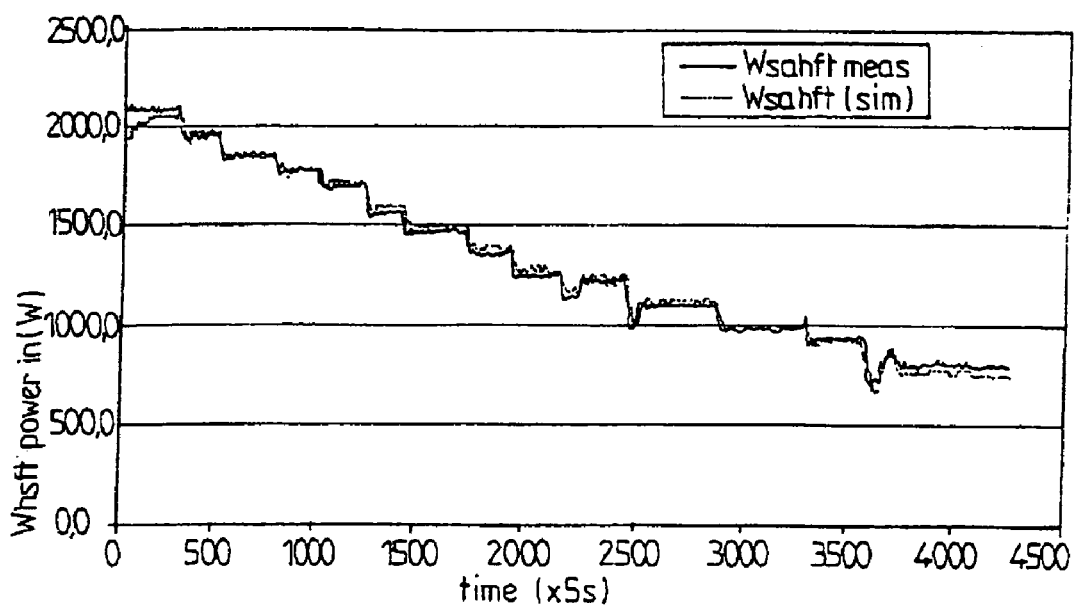
Figure 7:
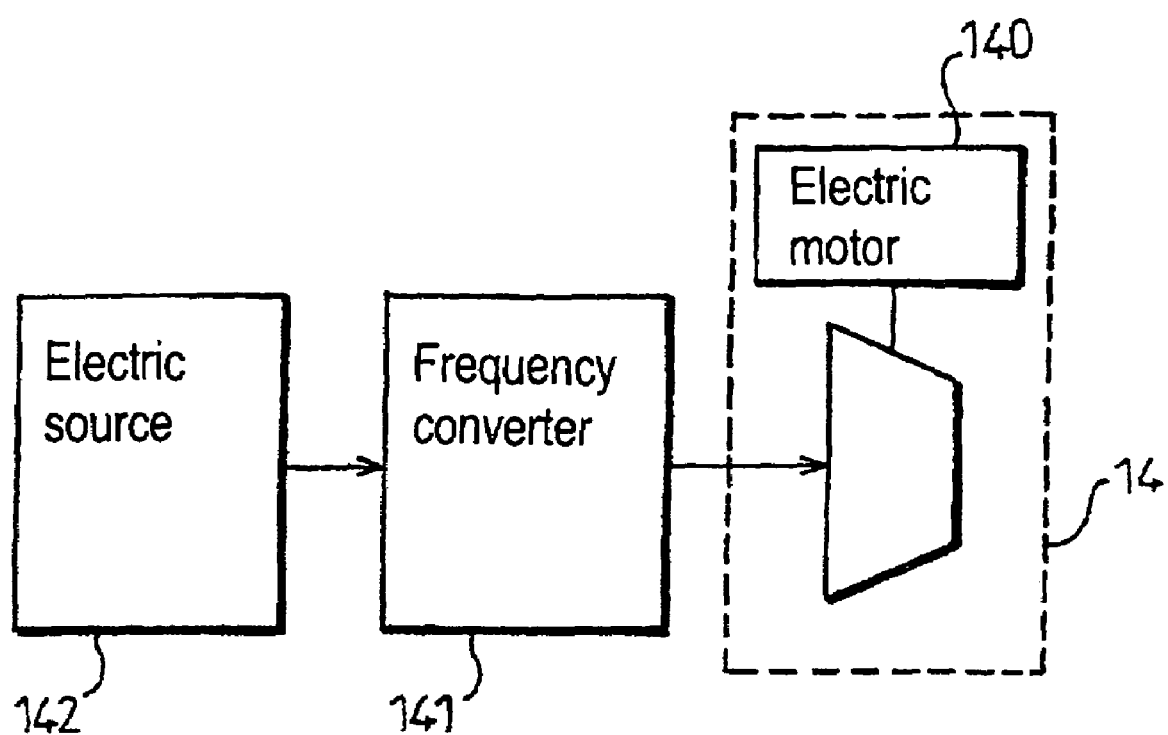
Figure 8:
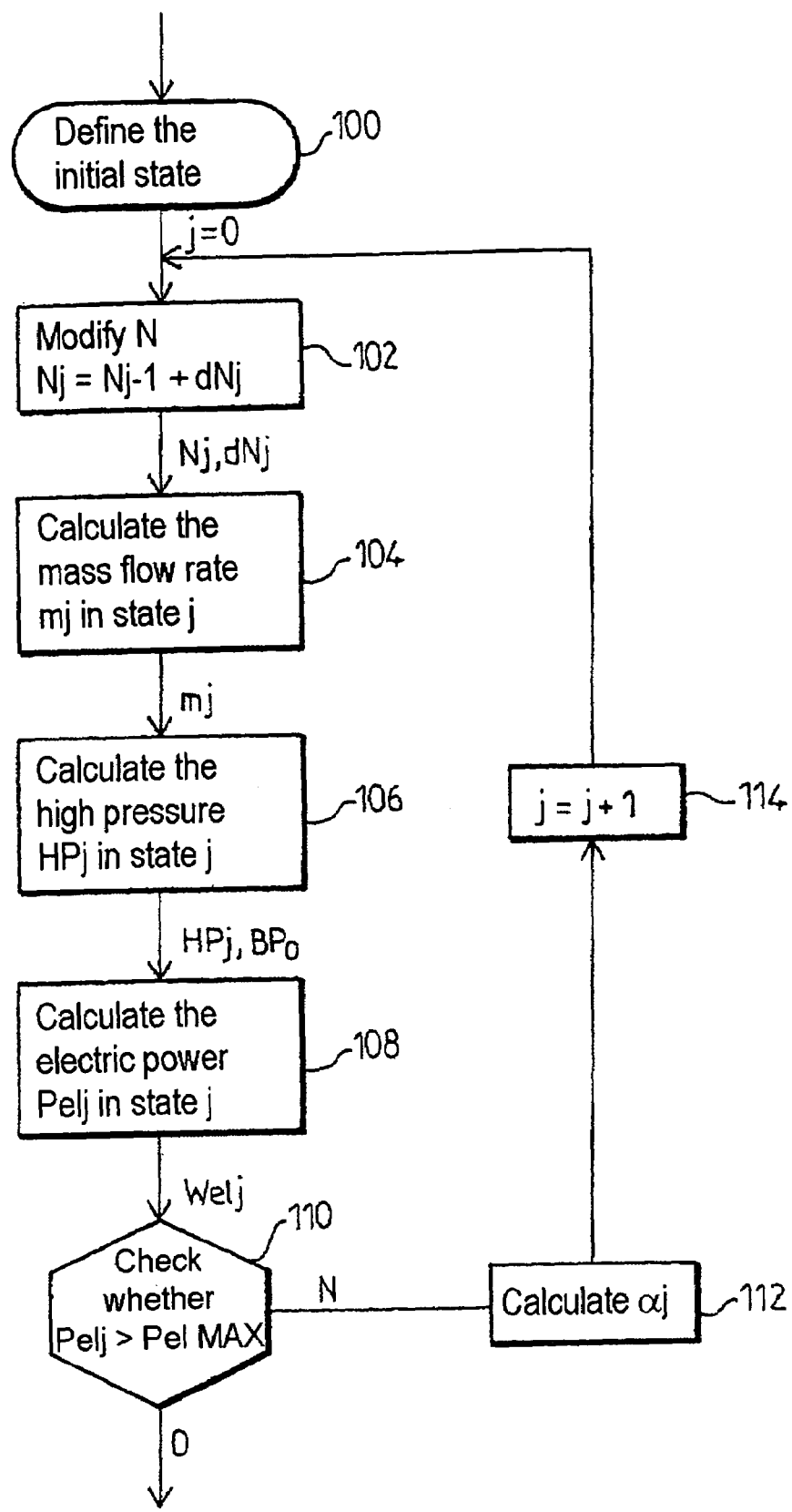

Other characteristics and advantages of the invention will become apparent on examining the detailed description hereinafter, and the appended drawings in which:

FIG. 1 represents an overall view of an air conditioning device installed on board a vehicle, FIG. 2 is a diagram of a motor vehicle installation with engine furnished with a control device according to a first form of embodiment of the invention, FIG. 3 is a view similar to FIG. 2 in a variant embodiment, FIG. 4 illustrates the accuracy of estimation of the mass flow rate according to the invention, FIG. 5 illustrates the relation between the speed of the air and the speed of the vehicle, FIG. 6 is a chart illustrating the accuracy of estimation of the power absorbed by the air conditioning, according to the invention, FIG. 7 represents a block diagram of an electric compressor, and FIG. 8 is an exemplary flowchart of anticipation of command of speed of rotation.

Annex A comprises the main mathematical equations used in the installation.

The drawings contain, in essence, elements of definite nature. They shall therefore be able not only to serve to better elucidate the description, but also to contribute to the definition of the invention, as the case may be.

We refer firstly to FIG. 1 which represents an overall view of an air conditioning apparatus built into a vehicle. The air conditioning apparatus comprises a refrigerant closed circuit whose refrigerant may be any subcritical fluid, that is to say any fluid having a critical temperature above the temperature of the hot source. The air conditioning apparatus also comprises a compressor 14, a condenser 11, a desiccant tank 18, a relief valve 12 and an evaporator 13, traversed in this order by the refrigerant. The following description will be given chiefly with reference to the refrigerant R134a by way of nonlimiting example.

The condenser 11 receives an external air stream 16 so as to remove the heat drawn off from the cabin, which under certain operating conditions is set into motion by an electric fan assembly 15.

The evaporator 13 receives an air stream from a blower 20 supplied with an external air stream 18 and produces an air-conditioned stream 21 which is sent to the cabin of the vehicle.

FIG. 2 represents the installation, according to the present invention, set in place in a motor vehicle, possibly in motion with a forward speed Va. The motor vehicle is propelled by an engine 43, controlled by an injection computer 42. The computer receives information from various sensors which it interprets in order to adjust the parameters. It can therefore provide information 33 regarding instantaneous values relating to the operation of the vehicle, and especially the forward speed of the vehicle, the temperature of the external air entering the air conditioning apparatus, the speed of rotation of the compressor and the voltage of the electric fan assembly.

The vehicle is also equipped with the air conditioning apparatus 10 described above, represented diagrammatically in FIG. 2. Moreover, the installation comprises a cabin regulator 41 intended to fix the temperature preset of the external air 18 blown to the inlet of the evaporator 11.

The engine injection computer can act on the air conditioning apparatus by virtue of an air conditioning regulator 402. Using this link it is possible only to turn on or turn off the air conditioning apparatus according to the conditions related to the operation of the engine or to the external commands. For example, it makes it possible to prevent the air conditioning apparatus from being turned on when the engine is heavily loaded.

This link 402 is limited to this "all or nothing" mode of operation. In the absence of a device for instantaneously estimating the power absorbed by a mechanical compressor, or for estimating by anticipation the power absorbed by an electric compressor, the air conditioning regulator 402 may not adjust the operation of the air conditioning loop.

The Applicant has set in place such a device making it possible to improve this manner of operation, through the use of a simple relation, obtained from the laws of thermodynamics between the mass flow rate of the refrigerant and the high pressure.

To do this, the regulator of the cabin 41, the injection computer of the engine 42 and the air conditioning apparatus 10 are linked to an electronic card 401 for a bi-directional exchange of information.

The electronic card implements the solving of the equations that make it possible to obtain an estimate of the power absorbed by the compressor. It can transmit information which results from this estimate to the injection computer, via the link 32.

The electronic card 401 may be regarded as an integral part of the air conditioning regulator 402. The air conditioning regulator 402 has in particular the role of adapting the amount of heat drawn off from the cabin, the so-called refrigerating power, so as to attain the preset of air blown to the inlet of the evaporator. This preset is previously indicated to the air conditioning regulator 402 by the cabin regulator (link 35).

The electronic card 401 retrieves information 30 originating from the sensors set in place on the air conditioning apparatus. It also receives information from the injection computer of the engine 42 via the link 33, in particular the forward speed of the vehicle, the voltage of the electric fan assembly, the speed of rotation of the compressor or the temperature of the external air.

The cabin regulator 41 exchanges information with the air conditioning regulator, said information relating to the pre-set of air blown to the inlet of the evaporator, by means of the links 34 and 35.

The links 30, 33 and 35 of the electronic card 401 with the air conditioning apparatus 10, the injection computer of the engine 42 and the regulator of the cabin 41 are aimed at determining the instantaneous values of the condensation temperature Tk, of the temperature of the external air at the inlet of the condenser Taek, of the pressure at the inlet of the compressor, the so-called low pressure LP, of the pressure at the outlet of the compressor, the so-called high pressure HP, of the forward speed of the vehicle Va, of the voltage of the electric fan assembly EFA and of the speed of rotation of the compressor N.

The instantaneous values of HP and Tk being related by the law of saturation of fluids, it is sufficient to determine one of these two values, the other being deducible by the electronic card by means of the relation in accordance with the law of saturation of fluids. Furthermore, the values of the forward speed of the vehicle Va, of the voltage of the electric fan assembly EFA and of the speed of rotation of the compressor N are data accessible to the injection computer of the engine.

They are therefore transmitted directly by the latter to the electronic card via the link 33. Several possibilities then exist for providing the electronic card with the other parameters. In particular, the setting in place of sensors on the air conditioning apparatus 10 and possibly the use of additional information originating from the injection computer 42 contribute to the obtaining of these parameters.

The simple relation obtained by the Applicant relates more precisely the mass flow rate, the high pressure and other parameters relating to the operation of the air conditioning apparatus and to the operation of the vehicle.

In a first form of embodiment, described hereinafter, a mechanical compressor is used. An object of the device according to this first form of embodiment of the invention is to estimate the mass flow rate m of the refrigerant passing through the air conditioning circuit and to estimate on the basis of this value the mechanical power Pa absorbed by the air conditioning loop.

The relation of annex A1 indicates that by knowing the condensation temperature Tk, the temperature of the external air at the inlet of the condenser Taek and the constant A, it is possible to estimate the mass flow rate m of the refrigerant.

The link 33 from the injection computer of the engine provides the instantaneous values of the forward speed of the vehicle Va and of the voltage of the motor fan assembly EFA. These values allow the calculation of the mass flow rate of the air Cpa and subsequently of the constant A, having regard to the relation of annex A1 which relates A to Cpa (annex A1). FIG. 5 shows in fact that the mass flow rate of the air is related to the forward speed of the vehicle Va and to the voltage of the electric fan assembly EFA.

In a particular embodiment, the device comprises two sensors for measuring the condensation temperature Tk, and the temperature of the external air at the inlet of the condenser Taek.

In FIG. 2, the condensation temperature Tk is measured by the sensor 23 which is a probe placed at the inlet of the condenser directly within the refrigerant. This location is chosen such that the refrigerant is in a liquid/vapor mixture state, for example at the end of the first pass of the condenser if the latter contains 4 passes.

As a variant, the condensation temperature Tk may be measured indirectly. To do this, use is made of the sensor 123 of FIG. 3 which measures the value of the high pressure HP at the outlet of the compressor. The electronic card 401 will then calculate the value of the condensation temperature Tk by using the law of saturation of fluids. In the embodiments of FIG. 3, the sensor 123 which measures the instantaneous value of the high pressure HP may be placed at any appropriate spot between the outlet of the compressor and the inlet of the condenser, or preferably between the outlet of the condenser and the inlet of the relief valve.

With reference to FIG. 2, the temperature Taek of the external air at the inlet of the condenser 11 is measured by the sensor 25 which is a temperature probe placed between the electric fan assembly 15 and the condenser 11.

In another embodiment, only one sensor is used in the air conditioning circuit for the estimation of the instantaneous value of the mass flow rate of the refrigerant. This sensor is the sensor 23 (or 123), which measures the instantaneous value of the condensation temperature Tk.

With reference to FIG. 3, the instantaneous value of the temperature Taek of the external air at the inlet of the condenser (11) is then calculated by the electronic card, on the basis of the instantaneous values of the forward speed Va of the vehicle and of the temperature of the external air Text at the inlet of the electric fan assembly, these being provided by the injection computer of the engine 42 and by the cabin regulator 41.

In all these embodiments, the measured or calculated instantaneous values of the condensation temperature Tk, and of the temperature of the external air at the inlet of the condenser Taek are associated with the constant A, according to the relation of annex A1, by the electronic card so as to calculate an estimate of the mass flow rate of refrigerant in the air conditioning circuit.

FIG. 4 illustrates the accuracy of estimation of the mass flow rate of the refrigerant flowing around the air conditioning circuit. The graph of FIG. 4 represents the discrepancy between a first curve corresponding to the variations of the estimated mass flow rate of the refrigerant R134a (m134a sim) as a function of time and a second curve corresponding to the variations of the actual mass flow rate of the refrigerant R134a (m134a kg/h) as a function of time.

The graph indicates a smallish discrepancy between the two curves and consequently satisfactory accuracy. This discrepancy is satisfactory in respect of the estimate of the power absorbed by the compressor.

Advantageously, the Applicant has found that this estimate of the mass flow rate of refrigerant which offers worthwhile accuracy under the conditions stated previously made it possible to calculate the mechanical power absorbed by the compressor.

With reference to FIGS. 2 and 3, the device described previously is devised so as to obtain the information which makes it possible, according to the relations of annexes A2 and A3, to calculate the mechanical power absorbed. In addition to the estimate of the mass flow rate, this information pertains to the estimate of the work of isentropic compression Wis and the speed of rotation of the compressor N. The constants B, C and D and E are related to operating parameters of the air conditioning circuit and hence fixed as calculation parameters.

The electronic card 401 estimates the compression ratio Pr on the basis of the values of the high pressure HP and of the low pressure LP, so as to calculate the work of isentropic compression Wis. The high pressure HP has been measured by the device for estimating the mass flow rate, directly or indirectly (through calculation of the condensation temperature). Moreover, the speed of rotation of the compressor N is delivered to the electronic card by the injection computer of the engine 42 via the link 33 with reference to FIGS. 2 and 3. It remains to measure the value of the low pressure LP.

In a variant embodiment with reference to FIG. 2, the instantaneous value of the low pressure LP is measured directly by a sensor 22 which may be placed at any desired spot between the evaporator and the compressor. This measurement is transmitted to the electronic card 401, via the link 30.

The instantaneous value of the low pressure LP may also be measured indirectly. In this case, the sensor is a probe, designated by the reference 122 in FIG. 3, which measures the evaporation temperature. The evaporation temperature is, in fact, related to the low pressure LP by the law of saturation of fluids. This probe may be a probe with thermistor, of conventional structure, placed in the vanes of the evaporator.

As a variant, the low pressure could be estimated indirectly on the basis of the air temperature at the outlet of the evaporator (13), of the high pressure HP, of the external air temperature Text and of the voltage of the blower. The cabin regulator 41 can provide the temperature preset of the cabin as well as the voltage of the blower so as to calculate an estimate of the air flow rate at the evaporator level. However, this variant has the drawback of being rather inaccurate.

The probe may furthermore be placed actually within the refrigerant, in a duct or in the relief valve 12 for example.

In this embodiment, the measured value of the evaporation temperature is transmitted to the electronic card (link 30) which applies the law of saturation of fluids so as to deduce therefrom the value of the low pressure LP.

FIG. 6 illustrates the accuracy of measurement of the mechanical power according to this embodiment, during tests carried out for a mass flow rate of the air of 2000 kg/h and of a temperature of the external air Taek of 35° C. The graph shows that the discrepancy between the curve representing the estimated mechanical power absorbed by the compressor (Wshaft meas) and the actual mechanical power absorbed by the compressor (Wshaft sim) is smallish, thus indicating satisfactory measurement accuracy. Nevertheless, this accuracy depends on the quality and on the estimate of Tk and of Taek.

The computer then forwards the estimated value of the mechanical power absorbed by the compressor to the injection module of the engine. The computer then adapts the nominal mechanical power absorbed by the compressor if this power exceeds a maximum value defined by the computer on the basis of this estimated value. Subsequently, the fuel consumption is reduced and the excessive increases in the power absorbed by the compressor are better controlled.

In the case of internally controlled mechanical compressors, the device according to the present invention is likewise used to estimate the mechanical power absorbed by the compressor. However, for this type of compressor, this estimated power is used to decouple the compressor so as to reduce the mass flow rate of refrigerant absorbed by the compressor.

In a second embodiment, the compressor is an electric compressor. An object of the device according to this second embodiment is to estimate the high pressure and on the basis of this value to estimate the value of the electric power absorbed by the compressor.

It is a further aim of this second embodiment to carry out an anticipation of command of speed of rotation.

FIG. 7 represents an electric compressor diagram. The electric compressor 14 is actuated by an integrated electric motor 140 by appropriate means of command and is supplied from an electric source 142 of battery type. This source transmits energy to the compressor via a frequency converter 141.

In electric compressors, the volumetric capacity is fixed, and hence it is simple to ascertain the instantaneous electric power absorbed by the compressor, in accordance with the equation of annex A4.

Electric compressors comprise limiters of absorbed power so as to cut off the air conditioning should the instantaneous value of the power absorbed be greater than the nominal power. However, these limiters intervene after the nominal power has been attained, and therefore do not anticipate the overshoot.

It is known that the mass flow rate of the fluid varies as a function of the speed of rotation. Now, the existing relations do not make it possible to deduce the electric power absorbed by the compressor other than as a function of the variations of the high pressure.

A solution, according to the invention, consists in calculating the value of the high pressure on the basis of the variation of the mass flow rate so as to estimate the value of the electric power absorbed, within the context of an anticipation.

Advantageously, the Applicant has used the relation of annex A1 which relates the mass flow rate of the refrigerant to the parameters related to the operation of the air conditioning apparatus and to the operation of the vehicle, to estimate this value of the high pressure HP.

FIGS. 1 to 3 apply likewise to this embodiment.

The electronic card receives the information from the computer 42 and from the air conditioning apparatus 10 so as to solve the equation of annex A1. The computer transmits the value of the mass flow rate of the fluid, the forward speed of the vehicle and the voltage of the electric fan assembly to the electronic card. The air conditioning apparatus transmits the value of the temperature of the air at the inlet of the condenser Taek, as measured in the manner described previously (FIGS. 2 and 3), to the electronic card.

The electronic card can then calculate an estimate of the value of the condensation temperature Tk according to annex A1. The condensation temperature Tk being related to the high pressure HP by the law of saturation of fluids, the electronic card deduces therefrom, through a simple calculation, the value of the high pressure HP.

The device is then capable of estimating the electric power absorbed by the compressor, within the context of an anticipation of command of speed. With reference to annex A4, the power is related to the compression ratio, hence to the high pressure HP and to the low pressure LP, as well as to the speed of rotation N of the compressor 14.

The sensor 22 of FIG. 2 (or the sensor 122 of FIG. 3) measures the instantaneous value of the low pressure and transmits it to the electronic card (via the link 30). The computer transmits the value of the speed of rotation N to the electronic card.

The electronic card can then associate these values with the value of the high pressure HP so as to deduce therefrom the value of the electric power absorbed by the compressor.

In this embodiment, the mechanical power absorbed by an electric compressor is estimated so as to anticipate the overshoot of a maximum electric power. Estimation allows the compressor to never attain a zone where the effectiveness of the compressor is very poor. This anticipation is possible since the device makes it possible to predict the value of the high pressure that would be obtained by increasing the mass flow rate absorbed by the compressor, thereby providing an estimate of the value of the speed of rotation not to be exceeded.

FIG. 8 represents a flowchart of anticipation of command of speed of rotation. The corresponding equations are indicated, in part, in annexes A4 to A6.

The sensors 22 (or 122) and 23 (or 123) measure initial values of the low pressure LP0 and of the high pressure HP0 and transmit them to the electronic card. The injection computer 42 provides the electronic card with the values of the speed of rotation N0 and of the mass flow rate of the fluid m0. The values HP0, LP0, N0 and m0 are obtained during the initial step 100. In the course of this step the electronic card furthermore calculates the value of the electric power Pel0, on the basis of Hp0 and Lp0. The electronic card also fixes the value of a coefficient, the so-called relaxation factor α0, at 1. The values HP0, LP0, N0, m0, Pel0 and α0 constitute the initial state.

The flowchart of FIG. 8 is iterative and therefore comprises various states labeled by the index j.

In step 102 corresponding to a state j, the card increases the speed of rotation of the compressor by an amount fixed by the air conditioning regulator, and modulated by the relaxation factor αj−1, as indicated in annex A5.

We then go to step 104 to calculate the corresponding value of the mass flow rate mj. It is deduced simply from the variation of the speed of rotation dNj and from its value Nj calculated in step 102 and from the previous value of the mass flow rate mj−1 (annex A6).

In step 106, the electronic card can then calculate the new value of the high pressure HPj in accordance with the relation of annex A1 and as described hereinabove.

This method of anticipation neglects the variations of the low pressure (LPj=LP0). On the basis of the new value of HPj and of the value of LP, the electronic card calculates, in step 108, the new value of the electric power Pelj, that is to say, the power that would be attained if the speed of rotation were to increase by dNj.

In step 110, the electronic card compares Pelj with the maximum power of the compressor. If Pelj is greater than this power, the value of the maximum speed of rotation not to be exceeded is Nj and the iteration is terminated. In the converse case, the electronic card repeats steps 102 to 110, after having reduced αj−1 and incremented j. αj is deduced from αj−1 and from the values of Pelj and Pelj−1, as indicated in annex A5.

The estimate of this speed of rotation is then used to regulate the operation of the air conditioning.

The anticipation of the command of speed, as described hereinabove, uses at each iteration a variation of the speed of rotation dNj chosen here by way of example. The invention is not limited to this pace of increase of the speed of rotation.

Moreover, the present invention is also aimed at the software code that it involves, most particularly when the latter is made available on any readable medium on a computer. The expression "computer readable medium" covers a storage medium, for example magnetic or optical, as well as a means of transmission, such as a digital or analog signal.

Annex A

A1. Measurement of the mass flow rate of a refrigerant $$m = A \cdot (Tk - Taek)$$

$$A = Ks \cdot [\Delta Hcdr \cdot (1 + Ks/(2 \cdot ma \cdot Cpa))]^{-1}$$

A2. Estimation of the compression work delivered by the compressor $$W_{is} = B \cdot (Pr(k-1)/k - 1)$$

A3. Estimation of the mechanical power absorbed by the air conditioning $$P_a = C \cdot m \cdot Wis + D \cdot N$$

$$Wis = E \cdot (Pr(k-1)/k - 1)$$

A4. Estimation of the electric power absorbed by the air conditioning $$Pel = (Wel)'$$

$$Wel = (F \cdot Wis + G \cdot N/r)$$

$$r = F_1 - F_2 \cdot Pr - F_3(N)$$

A5. Variation of the speed of rotation $$Nj = Nj - 1 + \alpha j \cdot dN0$$

$$\alpha j = \alpha j - 1 \cdot Pelj/Pelj - 1$$

A6. Estimation of the mass flow rate on the basis of the variation of the speed of rotation $$dmj = mj - 1 \cdot dnj/Nj$$

The invention claimed is:

1. An air conditioning installation for a vehicle with an engine, the installation comprising:
   an electric fan assembly (15);
   a first measurement facility (24);
   a second measurement facility (23);
   an electronic control device (401);
   an injection computer (42) that transmits information items (33); and
   a refrigerant (m) containing closed circuit comprising:
   a compressor (14) having an inlet and outlet;
   a condenser (11) having an inlet and outlet;
   a relief valve (12);
   a refrigerant that flows in the circuit having a certain mass;
   an associated mass flow rate when the refrigerant flows in the circuit; and
   an evaporator (13),
   wherein the first and second measurement facility measure values, relating to temperature or pressure at the inlet or outlet of the compressor or the condenser; and
   wherein the electronic control device (401) solves a linear equation that relates the mass flow rate of the refrigerant (m) to the values measured by the first and the second measurement facility and calculates an estimate of a quantity relating to the refrigerant, and further estimates the power absorbed by the compressor (14) based on the quantity relating to the refrigerant, of the measurements delivered by the measurement facilities and of the information items (33) transmitted by the injection computer (42).

2. An air conditioning installation, as in claim 1, further comprising an inlet of the condenser for an external air stream, where the temperature and pressure are measurable, an outlet of the compressor where pressures are measurable, and further comprising a third measurement facility, wherein the condenser receives a stream of air passing through the electric fan assembly (15), and the electronic control device (401) interacts with the refrigerant containing closed circuit (10) and the injection computer (42), and the measurement facilities are sensors that measure:

a first value relating to the temperature of the external air stream at the inlet of the condenser ($T_{aek}$), a second value relating to the pressure at the outlet of the compressor, termed the high pressure (HP), and;

a third value relating to the pressure at the inlet of the compressor, termed the low pressure (LP).

3. The air conditioning installation as in claim 2, wherein the compressor is a mechanical compressor and the quantity calculated by the electronic control device is the mass flow rate of the refrigerant (m).

4. The air conditioning installation as in claim 2, wherein the compressor is an electric compressor and the quantity calculated by the electronic control device is the high pressure (HP) of the refrigerant.

5. The air conditioning installation as in claim 2, wherein the first measurement facility is a probe (24), placed between the electric fan assembly (15) and the condenser (11), which delivers a measurement of the value of the temperature of the external air stream at the inlet of the condenser ($T_{aek}$).

6. The air conditioning installation as in claim 5, wherein the first measurement facility is a probe linked to the injection computer (42) which delivers a measurement of the value of the temperature of the external air stream ($T_{ext}$).

7. The air conditioning installation as in claim 6, wherein the electronic control device (401) is able to calculate an estimate of the value of the temperature of the external air stream at the inlet of the condenser ($T_{aek}$), on the basis of the value of the temperature of the external air ($T_{ext}$) and of the value of the forward speed ($V_a$) of the vehicle that are delivered by the injection computer (42).

8. The air conditioning installation as in claim 2, wherein the second measurement facility is a probe (23) placed at the inlet of the condenser (11) directly within the refrigerant, which delivers a measurement of the value of the condensation temperature ($T_k$).

9. The air conditioning installation as in claim 8, wherein the electronic control device (401) is able to calculate the value of the high pressure (HP) on the basis of the value of the condensation temperature ($T_k$) delivered by the second measurement facility.

10. The air conditioning installation as in claim 2, wherein the second measurement facility is a sensor (123), placed between the outlet of the compressor (14) and the inlet of the condenser (11), which directly measures the instantaneous value of the high pressure (HP).

11. The air conditioning installation as in claim 2, wherein the second measurement facility is a sensor (123), placed between the outlet of the condenser (11) and the inlet of the relief valve (12), intended to directly measure the instantaneous value of the high pressure (HP).

12. The air conditioning installation as in claim 10, wherein the electronic control device (401) is able to calculate the value of the condensation temperature ($T_k$), on the basis of the instantaneous value of the high pressure (HP) delivered by the second measurement facility.

13. The air conditioning installation as in claim 11, wherein the electronic control device (401) is able to calculate the value of the condensation temperature ($T_k$), on the basis of the instantaneous value of the high pressure (HP) delivered by the second measurement facility.

14. The air conditioning installation as in claim 2, further comprising a third measurement facility (122) and vanes in the evaporator (13), wherein the third measurement facility is a probe (122), placed in the vanes of the evaporator (13), which delivers a measurement of the instantaneous value of the evaporation temperature.

15. The air conditioning installation as in claim 2, wherein the third measurement facility is a probe (122), placed within the refrigerant, which delivers a measurement of the instantaneous value of the evaporation temperature.

16. The air conditioning installation as in claim 14, wherein the electronic control device is able to calculate the value of the low pressure (LP) on the basis of the instantaneous value of the evaporation temperature delivered by the second measurement facility.

17. The air conditioning installation as in claim 15, wherein the electronic control device is able to calculate the value of the low pressure (LP) on the basis of the instantaneous value of the evaporation temperature delivered by the second measurement facility.

18. The air conditioning installation as in claim 2, wherein the third measurement facility is a sensor (22), placed between the evaporator (13) and the compressor (14), which directly delivers a measurement of the instantaneous value of the low pressure (LP).

19. The air conditioning installation as in claim 3, wherein the first measurement facility is a probe (24), placed between the electric fan assembly (15) and the condenser (11), which delivers a measurement of the value of the temperature of the external air stream at the inlet of the condenser ($T_{aek}$), and the electronic control device (401) is able to calculate an estimate of the mass flow rate of the refrigerant on the basis of the values measured by the first and the second measurement facility and of two information items relating to the operation of the vehicle, that are transmitted by the injection computer (42).

20. The air conditioning installation as in claim 19, wherein the information items relating to the operation of the vehicle are related to the forward speed of the vehicle and to the voltage of the electric fan assembly.

21. The air conditioning installation as in claim 19, wherein the electronic control device (401) is able to calculate the power absorbed by the compressor on the basis of the calculated estimate of the mass flow rate, of the values measured by the second and the third measurement facility, and of information items relating to the operation of the vehicle, that are delivered by the injection computer (42).

22. The air conditioning installation as in claim 21, wherein the information items relating to the operation of the vehicle are related to the speed of rotation of the compressor.

23. The air conditioning installation as in claim 4, wherein the first measurement facility is a probe (24), placed between the electric fan assembly (15) and the condenser (11), which delivers a measurement of the value of the temperature of the external air stream at the inlet of the condenser ($T_{aek}$), and the electronic control device (401) is able to calculate an estimate of the high pressure (HP) of the refrigerant on the basis of the value measured by the first measurement facility, of the value of the mass flow rate of the refrigerant and of two information items relating to the operation of the vehicle, that are transmitted by the injection computer (42).

24. The air conditioning installation as in claim 23, wherein the information items relating to the operation of the vehicle are related to the forward speed of the vehicle and to the voltage of the electric fan assembly.

25. The air conditioning, installation as in claim 23, wherein the electronic control device (401) is able to calculate the power absorbed by the compressor on the basis of the estimate of the high pressure (HP) calculated, of the value measured by the third measurement facility, and of information items relating to the operation of the vehicle, that are delivered by the injection computer (42).

26. The air conditioning installation as in claim 25, wherein the information items relating to the operation of the vehicle are related to the speed of rotation of the compressor.

27. The air conditioning installation as in claim 23, wherein the electronic control device is capable, for a given starting state, of iteratively calculating values of the power absorbed by the compressor, on the basis of values of the high pressure corresponding to small chosen variations of the speed of rotation so as to estimate the maximum speed of rotation.

28. The air conditioning installation as in claim 27, wherein the values of the high pressure are calculated on the basis of the successive values of the mass flow rate of the refrigerant, which values are calculated as a function of the small variations of the speed of rotation.

29. The air conditioning installation as in claim 28, wherein the starting state comprises the values of the high pressure (HP) and of the low pressure (LP), measured by the second and the third measurement facility, corresponding to an initial speed of rotation.

* * * * *